United States Patent
Naitou et al.

(10) Patent No.: US 7,642,686 B2
(45) Date of Patent: Jan. 5, 2010

(54) ROTARY ELECTRIC MACHINE AND ELECTRIC WHEELCHAIR MOUNTED WITH ROTARY ELECTRIC MACHINE

(75) Inventors: Shinya Naitou, Iwata (JP); Haruyoshi Hino, Iwata (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 427 days.

(21) Appl. No.: 11/488,972

(22) Filed: Jul. 19, 2006

(65) Prior Publication Data
US 2007/0018528 A1   Jan. 25, 2007

(30) Foreign Application Priority Data
Jul. 20, 2005   (JP)   ............... 2005-210498

(51) Int. Cl.
*H02K 1/18* (2006.01)
(52) U.S. Cl. .......................... 310/218; 310/43
(58) Field of Classification Search .................. 310/268
See application file for complete search history.

(56) References Cited

U.S. PATENT DOCUMENTS

| | | | |
|---|---|---|---|
| 4,551,645 A | 11/1985 | Takahashi et al. | |
| 4,719,377 A | 1/1988 | Horie et al. | |
| 4,998,032 A | 3/1991 | Burgbacher | |
| 5,142,178 A | 8/1992 | Kloster et al. | |
| 5,234,066 A * | 8/1993 | Ahsing et al. | 180/6.5 |
| 5,489,811 A | 2/1996 | Kern et al. | |
| RE35,763 E | 4/1998 | Burgbacher | |
| 5,818,189 A | 10/1998 | Uchiyama et al. | |
| 6,157,112 A | 12/2000 | Suzuki | |
| 6,278,217 B1 * | 8/2001 | Kliman et al. | 310/254 |
| 6,407,472 B1 * | 6/2002 | Takayanagi | 310/45 |

(Continued)

FOREIGN PATENT DOCUMENTS

CN   1627596 A   6/2005

(Continued)

OTHER PUBLICATIONS

European Search Report, Application No. EP 06 01 5069, Mar. 22, 2007.

(Continued)

*Primary Examiner*—Quyen Leung
*Assistant Examiner*—Jose A Gonzalez Quinones
(74) *Attorney, Agent, or Firm*—Knobbe Martens Olson & Bear, LLP

(57) ABSTRACT

A rotary electric machine includes a stator including a plurality of teeth, a coil wound around each tooth, and a stator yoke core that connects the respective teeth, the teeth and the stator yoke core integrally fixed by a molding resin. The rotary electric machine also includes a rotor with a plurality of magnets that face the teeth, the magnets and teeth separated from each other by a space therebetween. Each of the teeth comprises a head portion facing opposite the magnets, a coil wind-up portion around which the coil is wound up, and an insert portion that can be inserted into the stator yoke core, the insert portion including a groove formed in a portion of the insert portion that protrudes from the stator yoke core, where the groove is fillable with the molding resin to inhibit the teeth from disengaging from the stator yoke core.

14 Claims, 19 Drawing Sheets

U.S. PATENT DOCUMENTS

| | | |
|---|---|---|
| 6,445,105 B1 | 9/2002 | Kliman et al. |
| 6,472,783 B1 | 10/2002 | Witthohn et al. |
| 6,717,324 B2 | 4/2004 | Chen |
| 6,809,453 B2 | 10/2004 | Narita et al. |
| 6,847,149 B2 * | 1/2005 | De Filippis ............ 310/216 |
| 7,173,357 B2 | 2/2007 | Naito et al. |
| 7,262,540 B2 | 8/2007 | Lee |
| 7,271,519 B2 | 9/2007 | Lee |
| 2003/0057796 A1 | 3/2003 | Fan et al. |
| 2004/0104638 A1 | 6/2004 | Yoneda et al. |
| 2004/0189137 A1 * | 9/2004 | Hashimoto et al. ........ 310/218 |
| 2005/0017596 A1 * | 1/2005 | Naito et al. ............. 310/268 |
| 2005/0146232 A1 * | 7/2005 | Yamamoto et al. ........ 310/43 |
| 2007/0018528 A1 | 1/2007 | Naitou et al. |
| 2007/0018529 A1 | 1/2007 | Naitou et al. |
| 2007/0020985 A1 | 1/2007 | Naitou et al. |

FOREIGN PATENT DOCUMENTS

| | | |
|---|---|---|
| EP | 1746703 A2 | 1/2007 |
| EP | 1746704 A2 | 1/2007 |
| EP | 1746705 A2 | 1/2007 |
| JP | 60152240 | 8/1985 |
| JP | 10-126982 | 5/1998 |
| JP | 11-18326 | 1/1999 |
| JP | 11-146617 | 5/1999 |
| JP | 11-318059 | 11/1999 |
| JP | 2000-334001 | 12/2000 |
| JP | 2003-224939 | 8/2003 |
| JP | 2004-80944 | 3/2004 |
| WO | WO 01/06623 | 1/2001 |
| WO | WO 01/84696 A1 | 11/2001 |
| WO | WO 2004/017488 | 2/2004 |
| WO | WO 2004/030187 | 4/2004 |

OTHER PUBLICATIONS

Office Action, EP 06 01 5069, Apr. 3, 2007.

Non-final Office Action mailed Nov. 17, 2008 in U.S. Appl. No. 11/489,699.

Non-final Office Action mailed Sep. 2, 2008 in U.S. Appl. No. 11/488,976.

* cited by examiner

PRIOR ART

PRIOR ART

PRIOR ART

PRIOR ART

ROTARY ELECTRIC MACHINE AND ELECTRIC WHEELCHAIR MOUNTED WITH ROTARY ELECTRIC MACHINE

CROSS-REFERENCE TO RELATED APPLICATIONS

This application claims the priority benefit of Japanese Patent Application No. 2005-210498, which was filed on Jul. 20, 2005.

BACKGROUND OF THE INVENTION

1. Field of the Invention

The present invention relates to a rotary electric machine having an improved fixing structure for teeth of a stator of the rotary electric machine, and also relates to an electric wheelchair (or electrically powered wheelchair) mounted with such rotary electric machine.

2. Related Art

In a known art, as such a rotary electric machine, there has been provided an axial gap type rotary electric machine as shown, for example, in FIGS. 16 to 19.

Referring to FIGS. 16 to 19, the rotary electric machine is provided with a stator 3 formed with teeth 2 and a rotor provided with a plurality of magnets (permanent magnets), not shown, in which the stator and the rotor are arranged with a gap in a rotation axis direction.

More in detail, as shown in FIG. 18, the each tooth 2 is composed of a plurality of steel plate sheets 2a laminated in a radial direction thereof for a countermeasure to core loss, and a plurality of such teeth 2 are arranged and fixed side by side with a predetermined distance in the circumferential direction of a disc, i.e., substantially ring-shaped, stator yoke core 6. Coils 5 are wound up around these teeth 2 through insulating material as bobbins 4. Further, as shown in FIG. 19, the teeth 2, the stator yoke core 6 and the coils 5 are integrally fixed by means of molding resin 7 such that surfaces 2b of the teeth 2 opposing to the rotor are exposed.

The steel plates 2a of the teeth 2 are assembled separately into a fitting hole of the stator yoke core 6 and then molded and fixed together by means of molding resin 7.

However, in such arrangement, because the molding resin 7 does not reach a portion surrounded by the bobbins 4, it was difficult to firmly fix the teeth 2.

Incidentally, the teeth 2 are attracted by magnets disposed so as to oppose to the teeth, and the attracting force of the magnet acts in an arrowed direction A in FIG. 19, so that it is necessary to consider a countermeasure for preventing the teeth 2 from coming off.

Then, it has been provided, as a method for preventing such coming-off of the teeth, to firmly push and fix the teeth 2 into a stator yoke core 6 or to fix the teeth by welding means.

In another method such as disclosed in the Japanese Patent Application Laid-open Publication No. HEI 11-146617, a notch is formed by means of punch to be fixed.

However, in such conventional methods, when the tooth 2 is pushed into the fitting hole of the stator yoke core 6 and then fixed thereto or is welded to thereby increase contacting strength therebetween, there is a fear that an electric resistance at this fixed portion is reduced and a closed circuit is formed around the fitting hole in a plan view, resulting in energy loss due to large induction current flow.

In addition, in the method of using the punch, a fixing process using the punch will be additionally required, and moreover, the use of the punch will give an adverse impact, thus being troublesome and inconvenient for dimensional control.

SUMMARY OF THE INVENTION

The present invention was conceived in consideration of the above prior art, and an object of the present invention is to provide a rotary electric machine capable of fixing teeth at reduced working steps and ensuring dimensional accuracy without reducing electric resistance at the teeth fixing portion and also to provide an electric wheelchair mounted with such rotary electric machine.

This and other objects can be achieved according to the present invention by providing, in one aspect, a rotary electric machine comprising:

a stator including a plurality of teeth which are each wound up by a coil and a stator yoke core connecting the respective teeth, the teeth and the stator yoke core being integrally fixed by means of molding resin; and a rotor provided with magnets disposed so as to oppose to the teeth, respectively, with a space therebetween, wherein each of the teeth is composed of a head portion opposing to the magnet, a coil wind-up portion which is wound up by the coil and an insert portion to be inserted into the stator yoke core, and a coming-off prevention portion for preventing the teeth from coming off is formed in the insert portion, the coming-off prevention portion being filled up with the molding resin.

In another aspect, the coming-off prevention portion is formed to an end portion, which is a portion that penetrates the stator yoke core, of the insert portion of the tooth.

In another aspect, there is also provided a rotary electric machine comprising:

a stator including a plurality of teeth which are each wound up by a coil and a stator yoke core connecting the respective teeth, the teeth and the stator yoke core being integrally fixed by means of molding resin; and a rotor provided with magnets disposed so as to oppose to the teeth, respectively, with a space therebetween, wherein each of the teeth is composed of a head portion opposing to the magnet, a coil wind-up portion which is wound up by the coil and an insert portion to be inserted into the stator yoke core, and the head portion is formed with an opposing surface to the rotor and at least a portion of the opposing surface is covered with the molding resin so as to provide a coming-off prevention portion for preventing the teeth from coming off.

In another aspect, the teeth and the magnets may be arranged so as to oppose to each other with a space in a rotation axis direction.

It is desirable that each of the teeth is composed of a plurality of magnetic steel plates which are laminated one by one, and fitting portions are formed to the respective steel plates so as to have protruded portions and recessed portions such that the protruded portion of the fitting portion of one magnetic steel plate is fitted and fixed to the recessed portion of the fitting portion of an adjacent magnetic steel plate when the magnetic steel plates are laminated together.

It may be desired that each of the teeth is formed into T shape by laminating the plurality of magnetic steel plates and has a head portion and a leg portion, the head portion being a wider portion of the T shape which is opposed to the magnet, the leg portion including the coil wind-up portion around which the coil is wound up and which has a substantially constant width and the insert portion which is inserted into the stator yoke core.

Furthermore, in a further aspect of the present invention, there is provided an electric wheelchair which comprises:

a frame structure constituting a vehicle body frame;

a seat disposed on the frame structure;

a pair of driving wheel units including two wheels;

a rotary electric machine mounted to each of the paired driving wheel units; and an operation member operatively connected to the rotary electric machine for operating the driving wheel units, the rotary electric machine having the structures defined in the above aspects.

According to the rotary electric machine of the present invention mentioned above, when the teeth and the stator yoke core are integrally fixed by means of the molding resin, the molding resin is filled in the coming-off prevention portions of the insert portions of the teeth, so that the teeth can be firmly fixed, thus preventing the teeth from coming off toward the rotor side.

In addition, this coming-off prevention process can be completed together with the filling process of the molding resin, thus eliminating the increase in the number of working processes, and the coming-off prevention process can be easily performed.

Moreover, as is different from the conventional technology, since the teeth are not fixed by press-fitting or welding process, the lowering in the electric resistance at this fixing portion can be effectively suppressed, and any large induction current does not pass, thus preventing the energy loss from occurring. No use of punch can eliminate damage from impact, thus ensuring the dimensional accuracy.

Furthermore, the coming-off prevention portions are made at the end portions, which is a portion that penetrates the stator yoke core, of the respective teeth. Therefore, the magnetic flux flow is not disturbed, and hence, the performance of the rotary electric machine is not deteriorated. The coming-off prevention function in the direction opposing to the insert direction can be more effectively performed.

Still furthermore, when the teeth are integrally fixed together with the coils and the stator yoke core by using the molding resin, at least a portion of the opposing surface of the head portion of each tooth is covered with the molding resin, so that the teeth can be firmly fixed, thus preventing the teeth from coming off toward the rotor (magnet) side.

Still furthermore, since the rotary electric machine is formed as an axial gap type machine, the rotary electric machine of the present invention can be made smaller, flatter, light-weighted and compact.

Still furthermore, each of the fitting portions formed to the magnetic steel plates has protruded and recessed portions, and the protruded portion of one steel plate is fitted into the recessed portion of the other adjacent steel plate to thereby easily laminate and fix the respective steel plates together.

Still furthermore, the electric wheelchair mounted with the improved rotary electric machine having compact structure and high output performance can be provided.

The nature and further characteristic features of the present invention will be made more clear from the following descriptions made with reference to the accompanying drawings.

DESCRIPTION OF THE PREFERRED EMBODIMENT

Preferred embodiments of the present invention will be described hereunder with reference to the accompanying drawings.

First Embodiment

The first embodiment of the present invention is represented by FIGS. 1 to 11.

Figure 1:
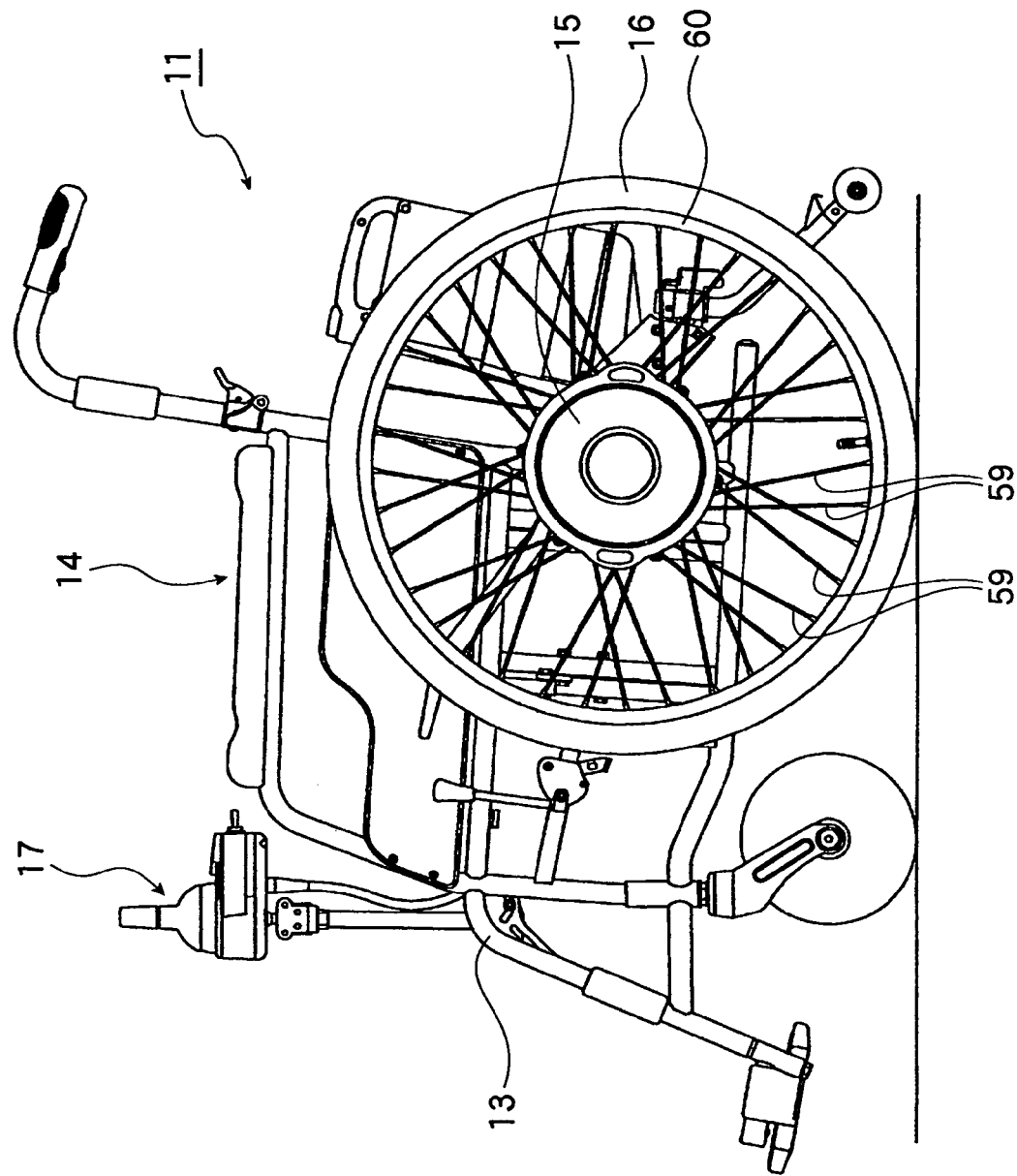
FIG. 1 is a side view of an electric wheelchair mounted with an electric motor according to a first embodiment of the present invention.
Figure 2:
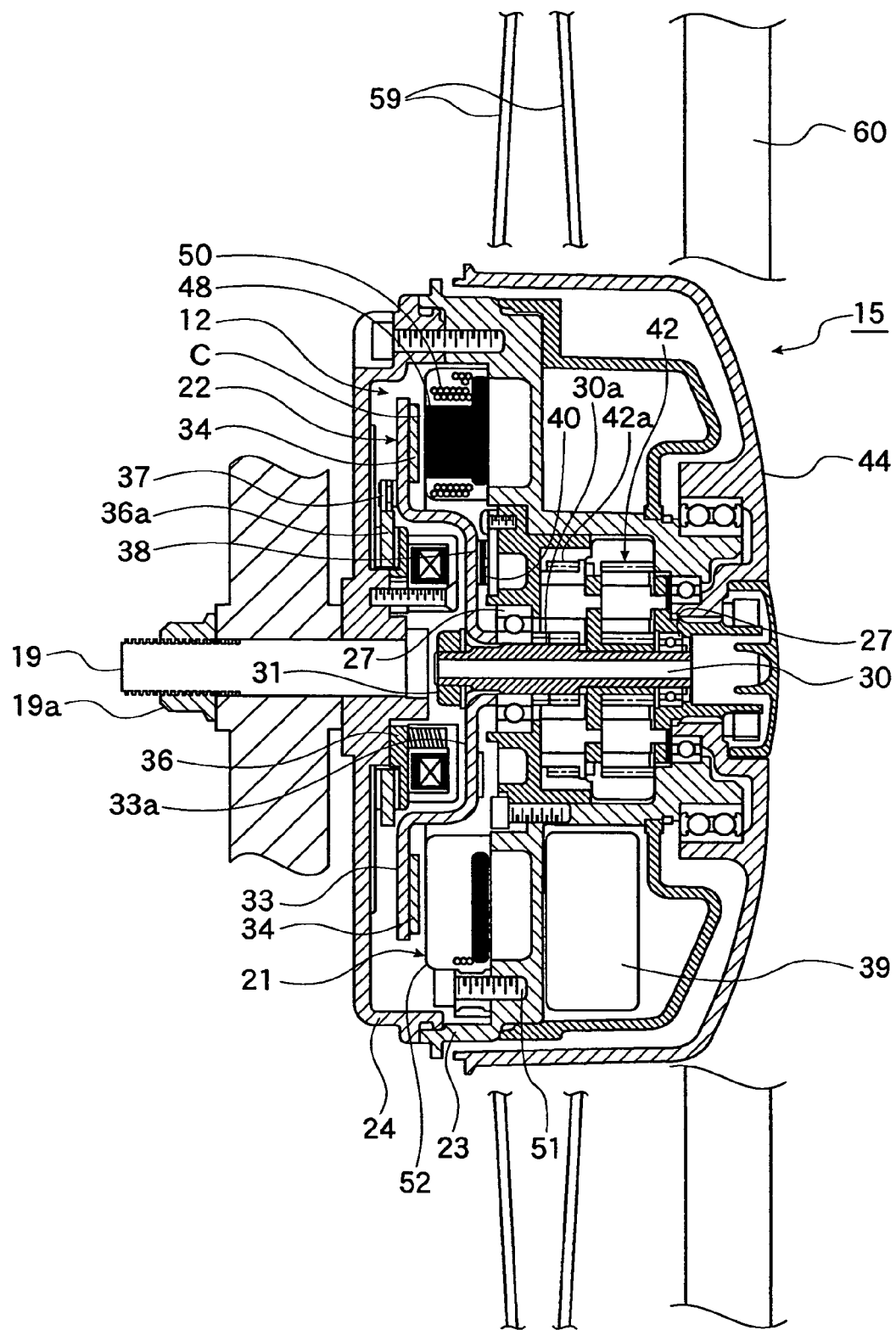
FIG. 2 is a sectional view of the electric motor for the electric wheelchair of the first embodiment.

With reference to FIGS. 1 and 2, reference numeral 11 denotes an electric wheelchair or electrically powered wheelchair mounted with an electric motor 12 as a rotary electric machine according to the present invention, and the electric wheelchair is driven and traveled by the driving force of the electric motor 12.

The electric wheelchair 11 is provided with a frame 13 as a framework of a vehicle (electric wheelchair body), a seat 14 on which a user sits and a pair of driving wheel units 15 in which the electric motors 12 (see FIG. 2) are mounted. When an operation unit 17 of the electric wheelchair 11 is operated, the paired driving wheel units 15 are driven so as to drive driven wheels 16 by predetermined amount (distance). The driven wheels 16 are operated independently, and by operation of the operation unit 17, the driven wheels 16 are changed in their rotating directions and driven speed, respectively, optionally.

The driving wheel unit 15 is composed, as a unit, of the electric motor 12, the driving unit, the driven wheels 16 and so on, and as shown in FIG. 2, the driving wheel unit 15 is fixed to the frame 13 by means of a bolt 19 and a nut 19a.

The electric motor 12 is of an axial gap type composed of a stator 21 and a rotor 22, which are accommodated in a space defined by a case 23 and a cover 24. The bolt 19 is planted to the cover 24.

The stator 21 is fastened to the case 23 by means of a bolt 51, and on the other hand, the rotor 22 is fitted to a rotor shaft 30, through serration fitting, provided for the case 23 to be rotatable through bearings 27, 27 and fixed thereto by nut 31.

Figure 3:
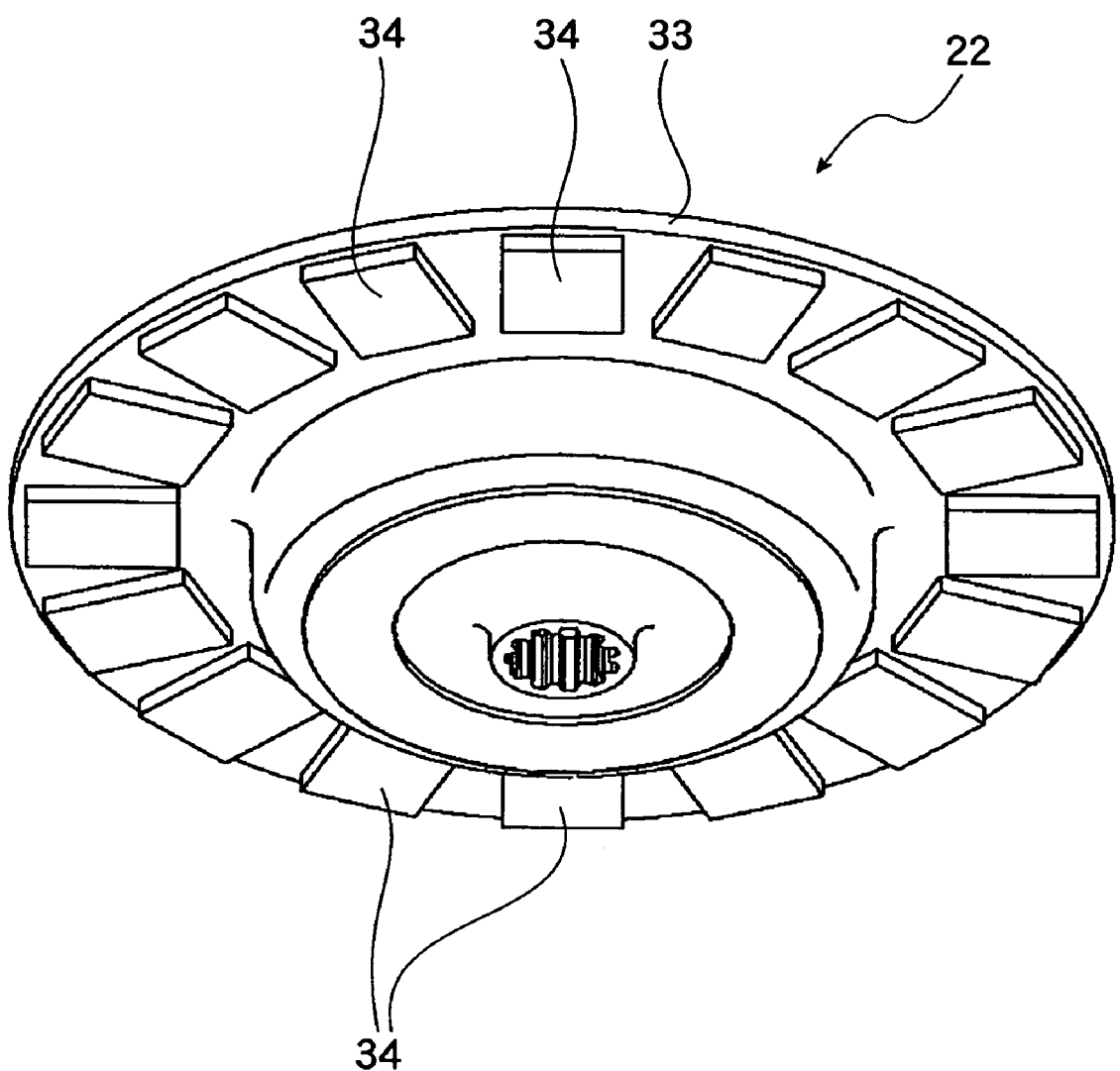
FIG. 3 is a perspective view of a rotor of the electric motor of FIG. 2.
Figure 4:
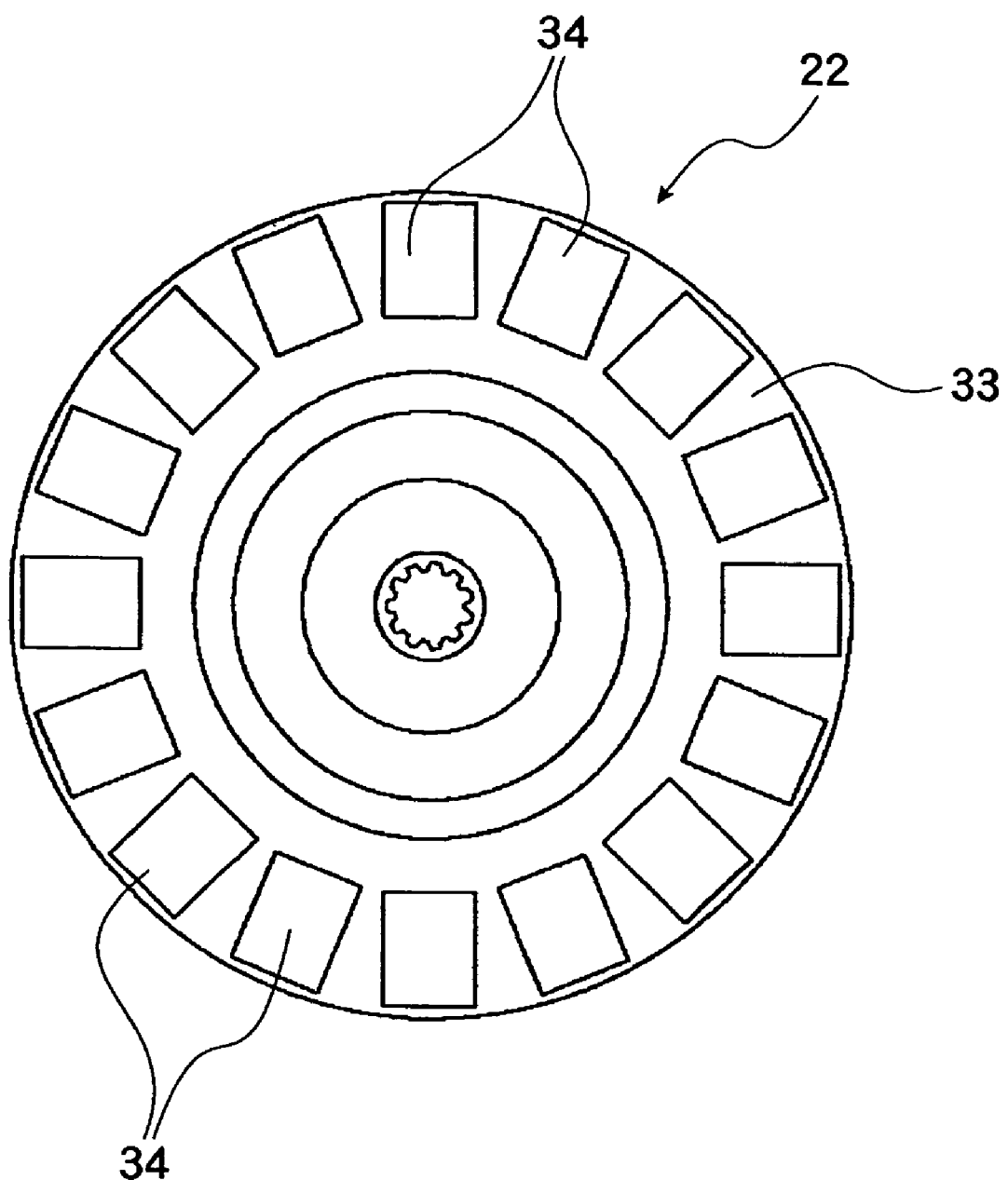
FIG. 4 is a front view of the rotor of the electric motor of FIG. 2.
Figure 5:
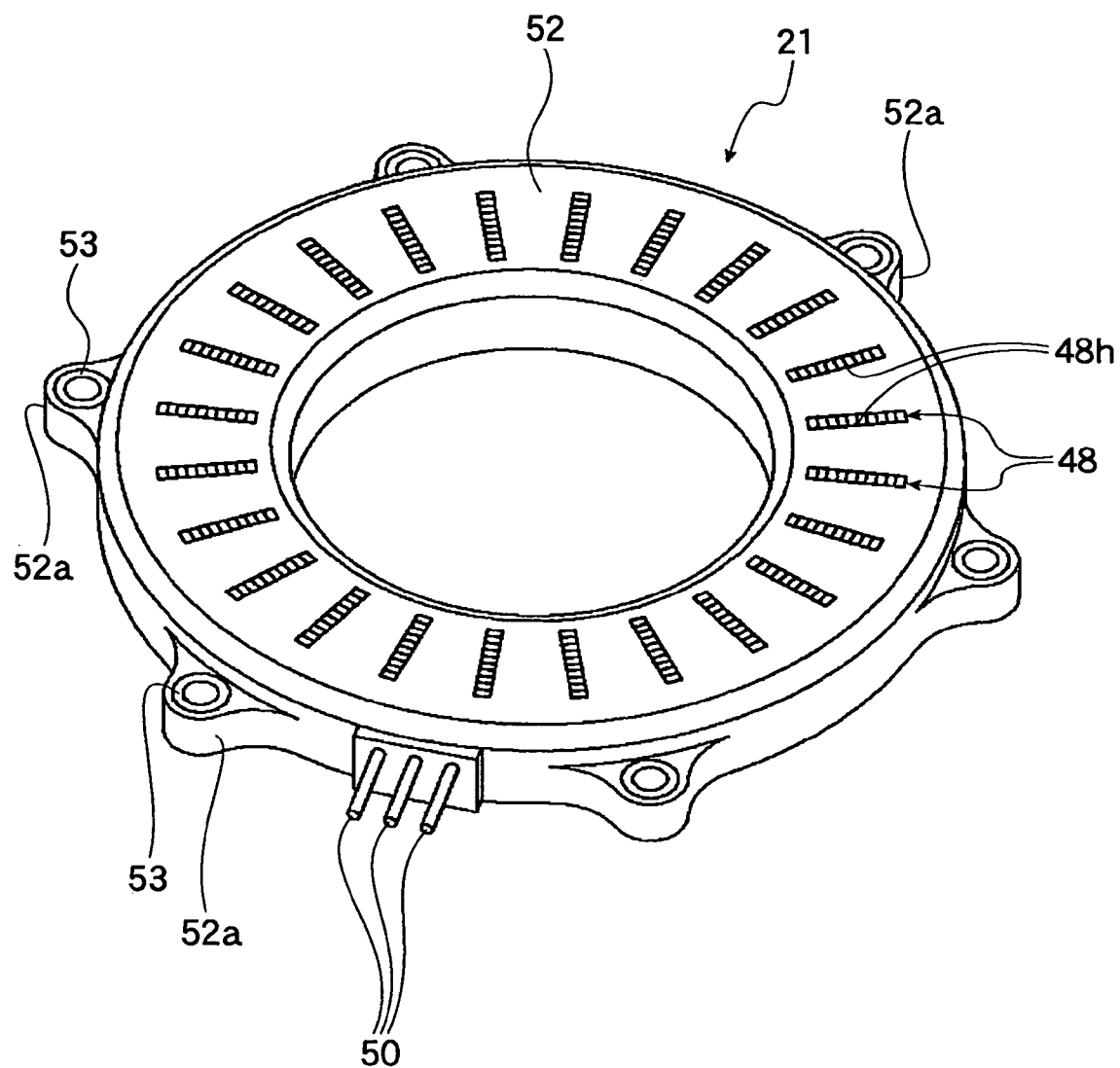
FIG. 5 is a perspective view of a stator of the electric motor of the electric wheelchair of the first embodiment.
Figure 6:
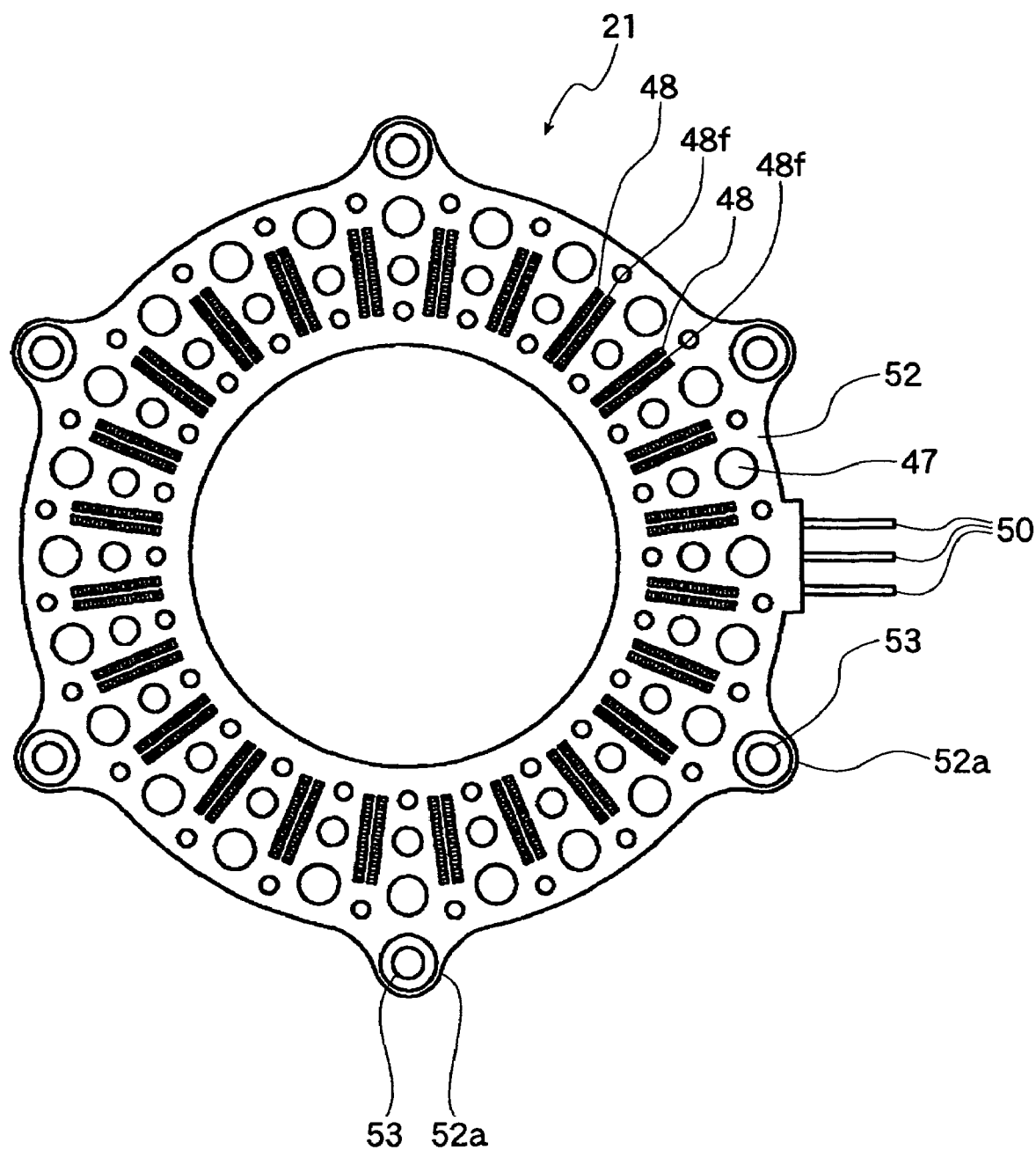
FIG. 6 is a back-side view of the stator of FIG. 5.
Figure 7:
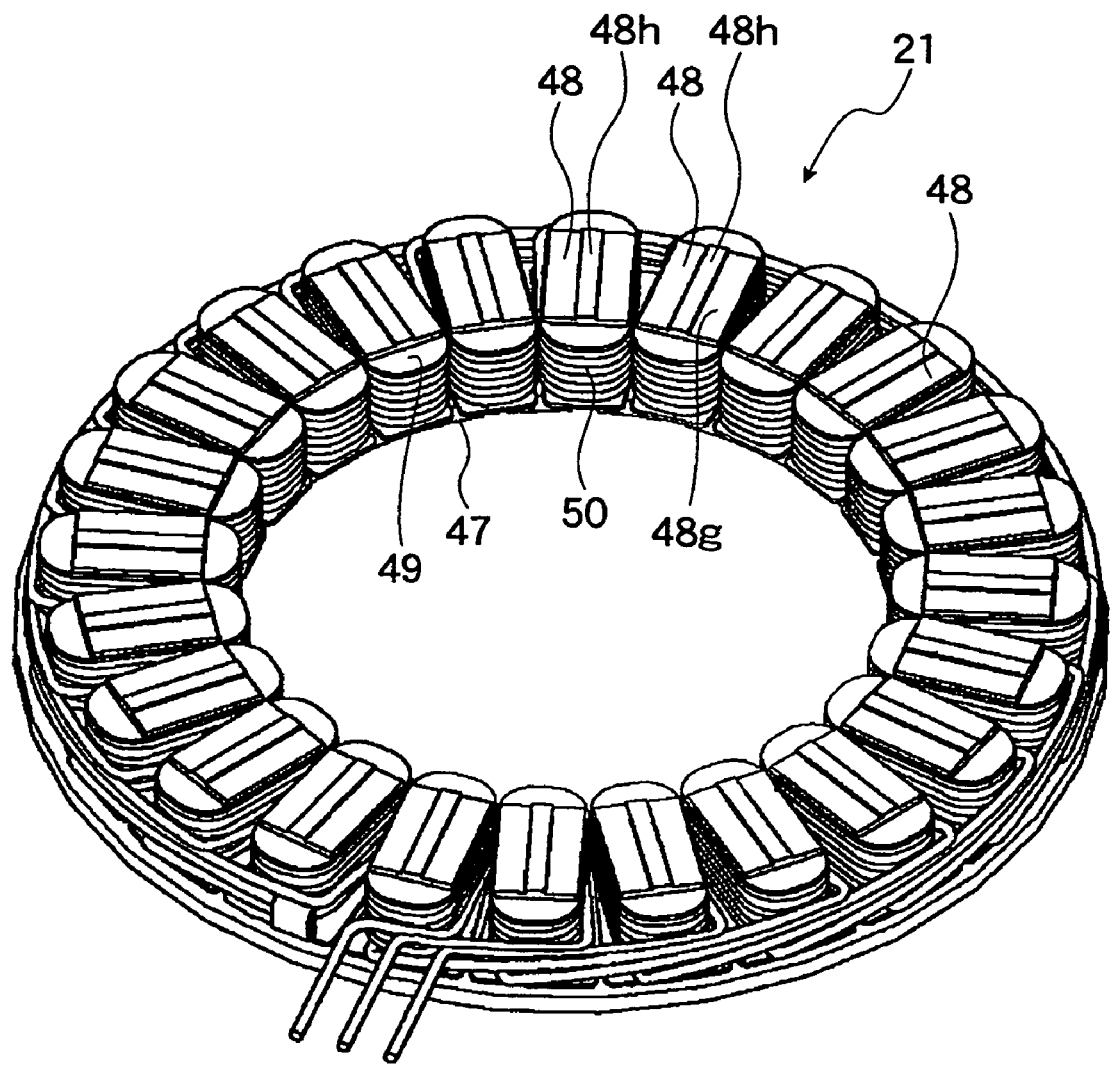
FIG. 7 is a perspective view of the stator, before molding, of the electric motor according to the first embodiment.

The rotor 22 has, as shown in FIGS. 3 and 4, a disc shaped rotor yoke 33, which has a central portion fitted to the rotor shaft 30 through the serration fitting. A plurality of magnets 34, each having a rectangular shape, are arranged and fixed to the peripheral edge portion of the rotor yoke 33 at a predetermined constant interval in the circumferential direction thereof. These magnets 34 are disposed so as to oppose to the stator 21 with a gap C (FIG. 2) in the rotation axis direction.

These magnets 34 are arranged so that N and S poles are adjacently alternated and bonded and fixed to the rotor yoke 33 in the shape of circle.

The rotor yoke 33 is press-worked as shown in FIGS. 2 and 3 so as to provide a central recessed shape 33a, and in this recessed portion 33a, an electromagnetic brake 36 fixed to the cover 24 is accommodated. An annular rotary body 36a and the rotor 22, of which rotations are stopped by the electromagnetic brake 36, are made stationary in the rotating direction through a pin 37. Moreover, on the other hand, a sensor magnet 38 is bonded and fixed to the side opposing to the recessed portion 33a, and a pole position sensor (hole IC) 40 opposing to the sensor magnet 38 is fixed to the case 23. The pole position sensor 40 is electrically connected to a controller 39, and the pole position of the rotor 22 is detected by the pole position sensor 40.

Further, a sun-gear 30a is mounted to the rotor shaft 30 so as to be meshed with a two-staged planetary gear 42a of a planetary reduction gear 42. The planetary reduction gear 42 reduces the rotation of the rotor 22, which is then transmitted to a hub 44, and the rotation of the hub 44 rotates the driving wheel 16.

On the other hand, the stator 21 is provided with a substantially disc (ring) shaped stator yoke core 47, a plurality of teeth 48 arranged in the circumferential direction of the stator yoke core 47 with a predetermined interval and a coil 50 wound up around each of the teeth (i.e., tooth) 48 by means of bobbins 49. The stator yoke core 47, the teeth 48 and the coils 50 are integrally molded and fastened together by the molding resin 52. At this time, a plurality of collars 53 are inserted around the stator 21 to thereby simultaneously form mount flanges 52a.

These mount flanges 52a are fixed to the case 23 by means of bolts 51.

The coil 50 is coupled with each of U, V and W-phases, and one end of each coupling coil is electrically connected (neutral point) and the other one end thereof is led outside of the mold so as to be connected to a driver.

Figure 8:
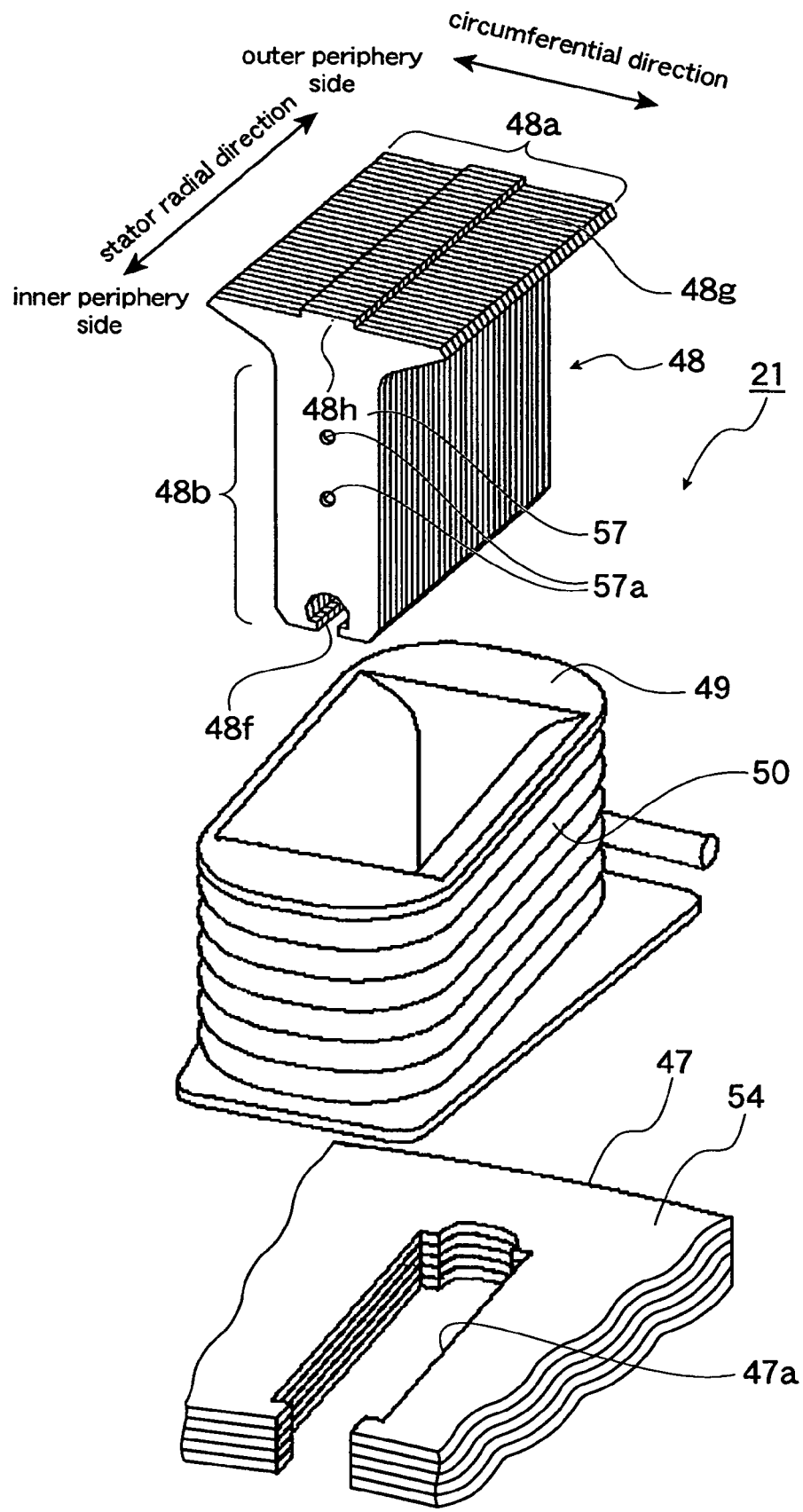
FIG. 8 is a developed perspective view showing a portion of the stator of the electric motor of the electric wheelchair of the first embodiment.
Figure 9:
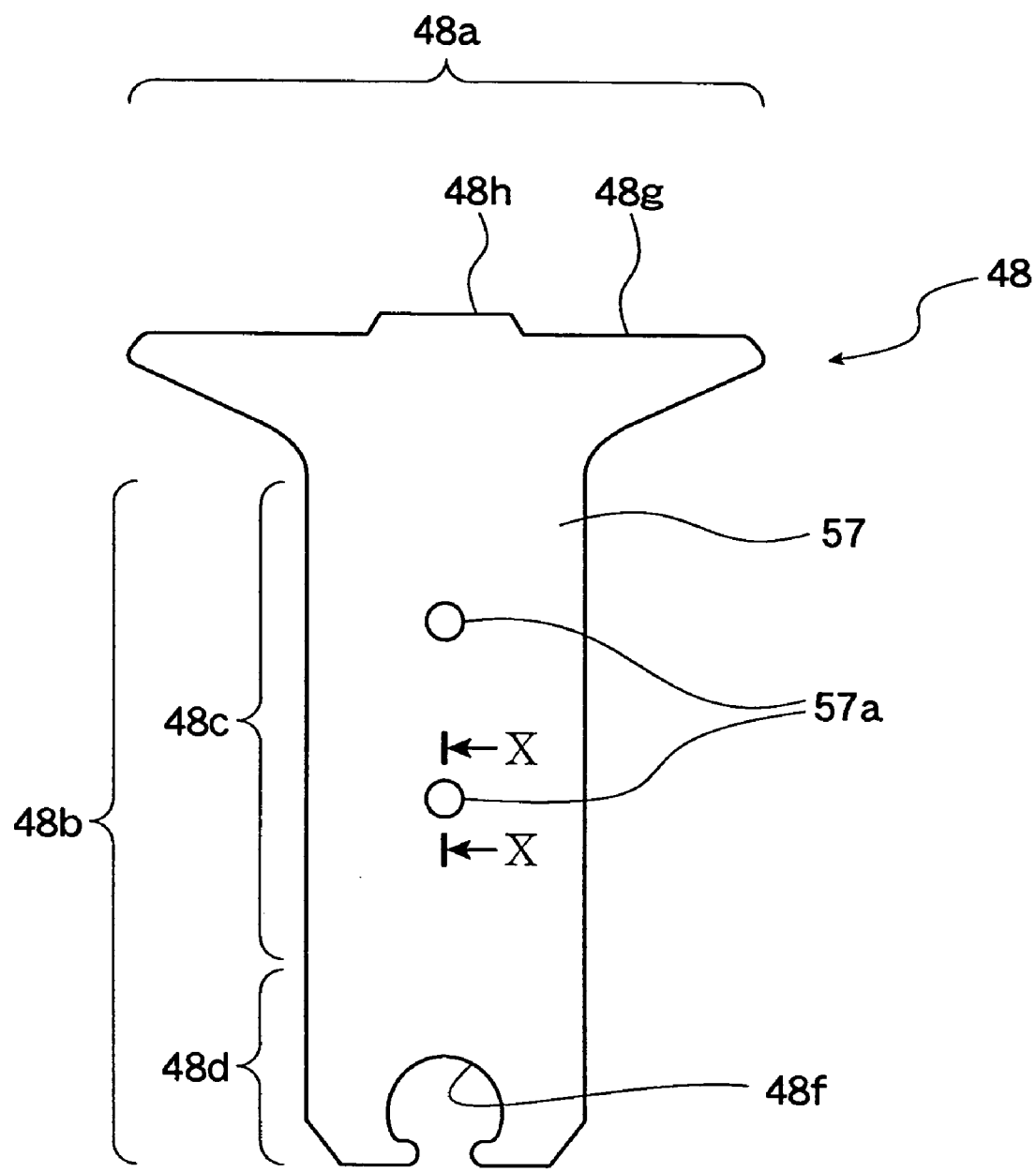
FIG. 9 is a front view of the tooth of the stator of the electric motor according to the first embodiment.

More in detail, the stator yoke core 47 is formed from a plurality of disc-shaped (substantially ring shape) magnetic steel plates 54, which are laminated as shown in FIG. 8, and formed with fitting holes 47a into which teeth 48 are inserted.

The tooth 48 is formed by laminating a plurality of magnetic steel plates 57 so as to provide a T-shape, and is composed of a head portion 48a, which is a wider portion of the T-shaped tooth 48, and a leg portion 48b thereof. The leg portion 48b includes a coil wind-up portion 48c having a constant width which is wound up by the coil 50 and an insert portion 48d to be inserted into the fitting hole 47a of the stator yoke core 47.

Figure 10:
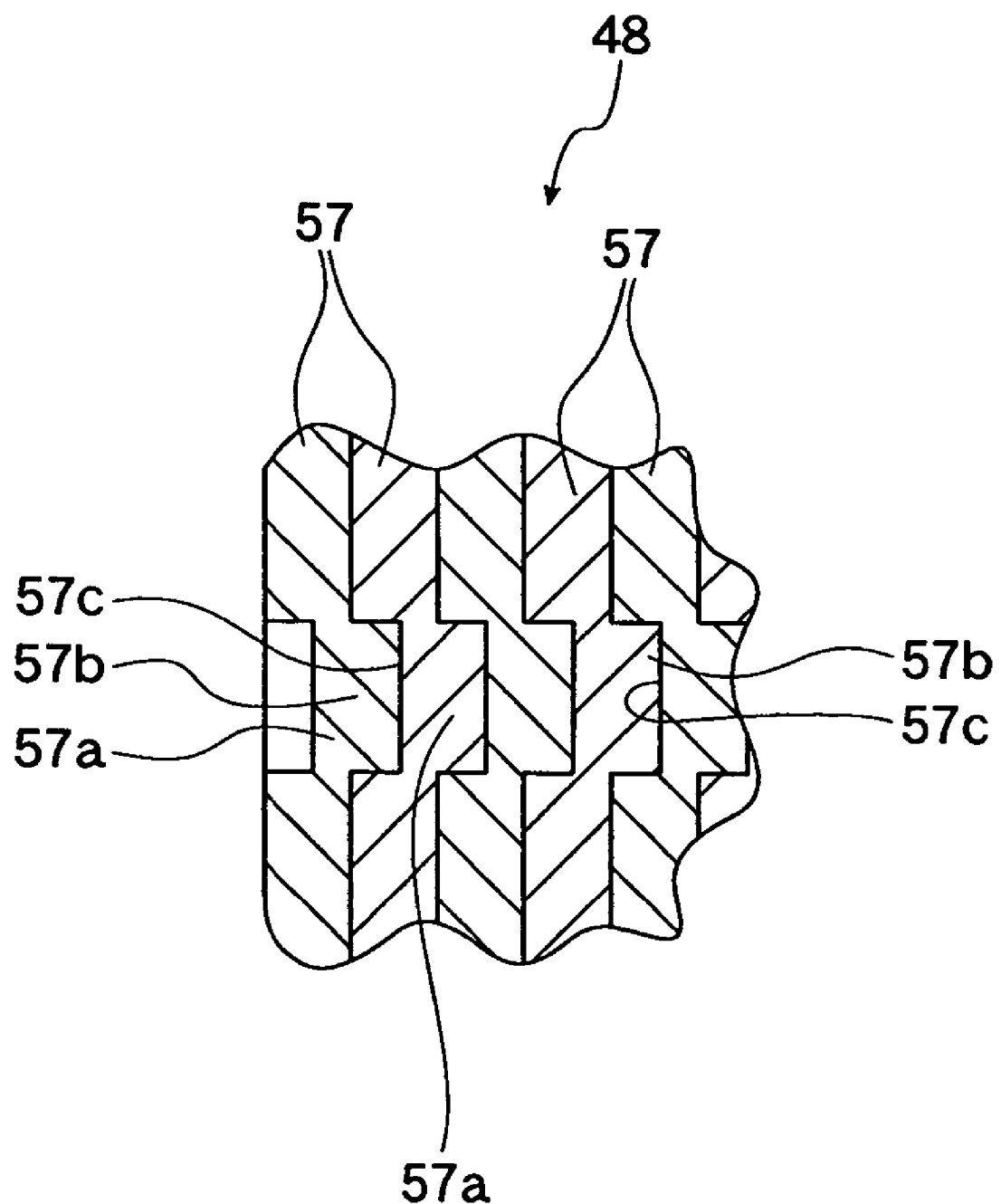
FIG. 10 is a sectional view taken along the line X-X in FIG. 9.

The wind-up portion 48c is formed with a plurality of half pierce portions 57a, two portions in the illustration, as fitting portions for fixing a plurality of laminated magnetic steel plates 57. Further, as shown in FIG. 10, the half pierce portion 57a is in the form of half blind hole shape (having protruded half portion and recessed half portion), so that this portion is called as "half pierce portion" 57a herein, and the substantially rectangular, in section, protruded half portion 57b of one magnetic steel plate 57 is fitted to the recessed half portion 57c of adjacent one magnetic steel plate 57.

Figure 11:
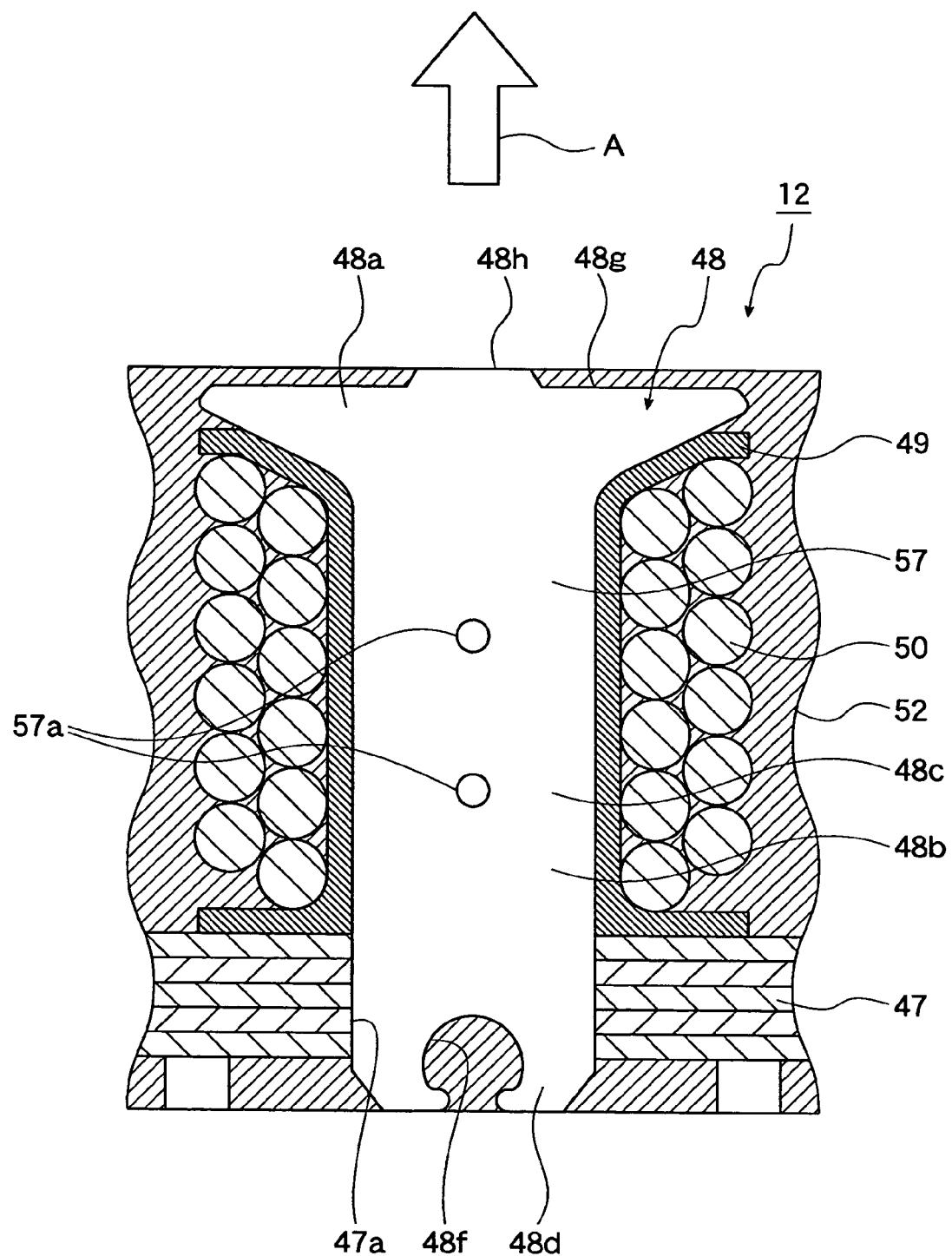
FIG. 11 is a sectional view, in an enlarged scale, showing a state in which the stator yoke core, the tooth (teeth) and the coil, which are fixed to a mold, according to the first embodiment.

Furthermore, as shown in FIG. 11, the tooth 48 is formed with a resin filling groove 48f, as a tooth coming-off prevention portion for preventing the tooth 48 from coming off, by filling the molding resin 52 into the insert portion 48d of the tooth 48.

The resin filling groove 48f is formed on the end surface side of the end portion, which is a portion that penetrates the stator yoke core 47, of the insert portion 48d of the tooth 48. The resin filling groove 48f has a narrow entrance, large inner space and approximately circular shape.

The head portion 48a of the tooth 48 is formed with a surface 48g opposing to the magnet 34 of the rotor 22, and this opposing surface 48g is formed with a protruded portion 48h extending in a radial direction at the central portion in the circumferential direction of the stator. This protruded portion 48h has uniform height and width along the entire length direction. The opposing surfaces 48g other than the protruded portion 48h are embedded with the molding resin 52 as shown in FIG. 11.

The opposing surfaces 48g of the teeth 48 and the magnets 34 of the rotor 22 are arranged so as to oppose to each other through a gap C in the axial direction of the rotation shaft.

Further, in FIG. 2, reference numeral 59 denotes a spoke of the wheel and 60 denotes a hand rim.

The first embodiment will be operated in the manner mentioned hereunder.

When current passes the coil 50 to be energized, the electric motor 12 is driven and the magnetic force of the coil 50 and that of the magnet 34 are combined to thereby generate magnetic force between the stator 21 and the rotor 22, thus rotating the rotor 22 and then driving the driven wheel 16 through the rotor shaft 30, the hub 44 and so on.

At this time, the magnetic flux flows through the rotor yoke 33, the magnets 34, the teeth 48 and the stator yoke core 47, and as shown in FIG. 11, magnet attracting force acts to the teeth 48 in the arrowed direction A.

In the described embodiment, when the teeth 48 are molded and fixed integrally with the molding resin 52 together with the coils 50 and the stator yoke core 47, the molding resin 52 fills in the resin filling groove 48f of the insert portion 48d of the tooth 48 and the portion other than the protruded portion 48h of the opposing surface 48g is covered with the molding resin 52, and accordingly, the tooth can be firmly fixed and prevented from coming off.

Furthermore, different from the conventional structure, since the teeth 48 are not fixed by press-fitting or welding process, the lowering in the electric resistance at this fixed portion can be suppressed, any large induction current does not pass and a large energy loss can be prevented from causing.

In addition, since there is no impact by the use of a punch, dimensional accuracy can be maintained. Moreover, a usual molding process using the molding resin 52 can perform simultaneously the coming-off prevention function. Accordingly, different from the conventional technology, no additional working process is needed.

Still furthermore, the resin filling groove 48f is formed to the end portion, which is a portion that penetrates the stator yoke core 47, of the tooth 48, the flow of the magnetic flux is not disturbed, and hence, the performance is not deteriorated, and moreover, the tooth 48 can be effectively prevented from coming off in a direction reverse to the inserting direction into the stator yoke core 47.

Each of the teeth (i.e., tooth) 48 is formed by laminating one kind of plural magnetic steel plates 57, so that the processing cost and mold cost can be significantly reduced. These magnetic steel plates 57 can be fitted and fixed together easily through the half pierce portions formed to the respective plates.

Further, according to the electric motor 12 of the embodiment of the present invention, the energy loss can be suppressed effectivily, so that an electric wheelchair 11 provided with the electric motor 12 having compact structure and high output performance can be also preferably provided.

Second Embodiment

Figure 12:
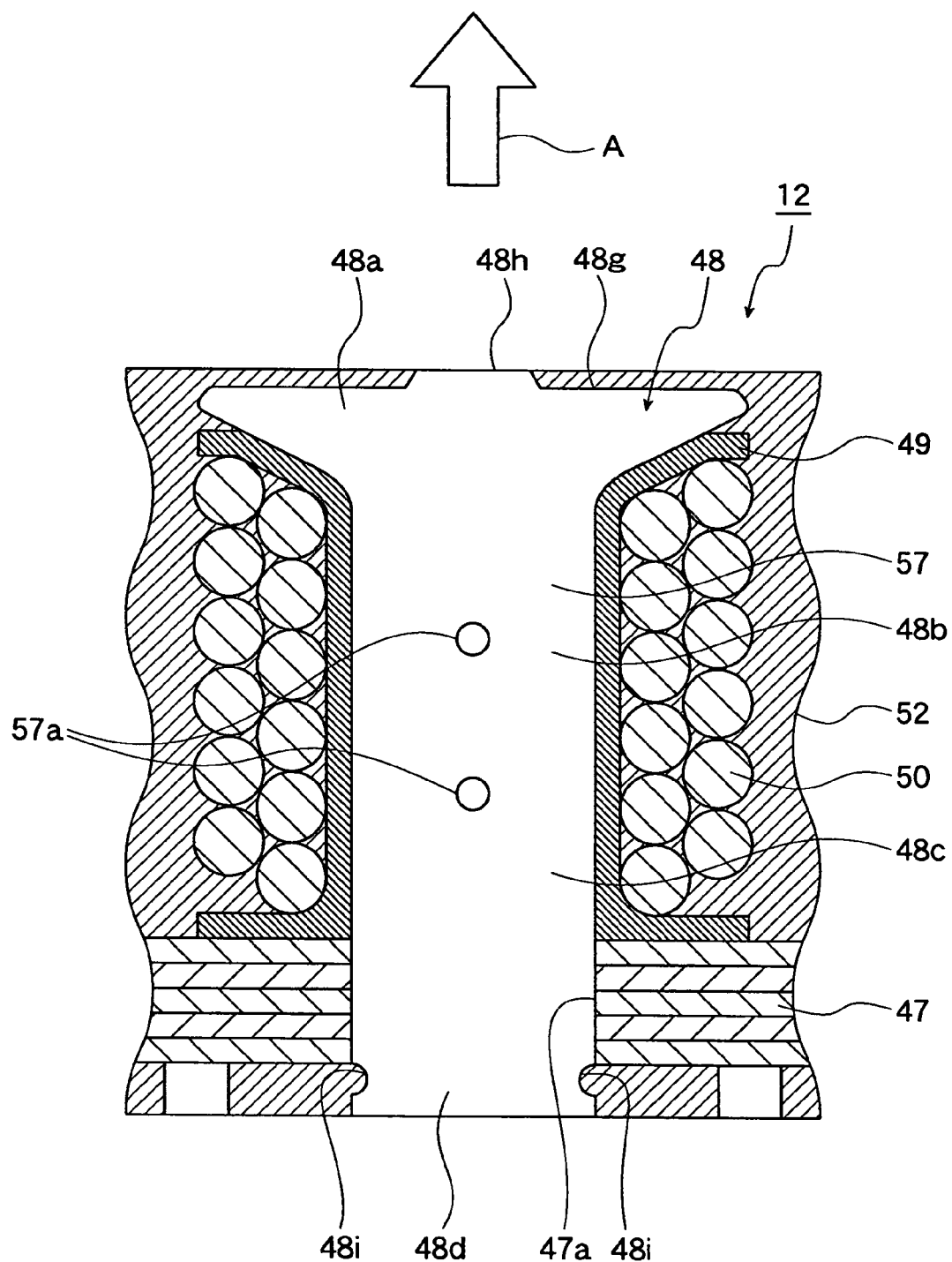
FIG. 12 is a sectional view, corresponding to FIG. 11, according to the second embodiment of the present invention.

FIG. 12 represents the second embodiment of the present invention.

In this second embodiment, the structure of the "coming-off preventing portion" differs from that of the first embodiment.

That is, in the first embodiment, the resin filling groove 48f as the "coming-off preventing portion" is formed on the end surface side of the end portion, which is a portion that penetrates the stator yoke core 47, of the insert portion 48d of the tooth 48, but in this second embodiment, a cut-out groove 48i as "coming-off preventing portion" is formed on the side surface side of the end portion, which is a portion that penetrates the stator yoke core 47, of the insert portion 48d of the tooth 48.

Even in this second embodiment having the above structure, the cut-out groove 48i is filled up with the molding resin 52, thus preventing the tooth 48 from coming off.

The structures and functions other than the above are substantially the same as those mentioned with reference to the first embodiment, and accordingly, the descriptions thereof will be omitted herein.

Third Embodiment

Figure 13:
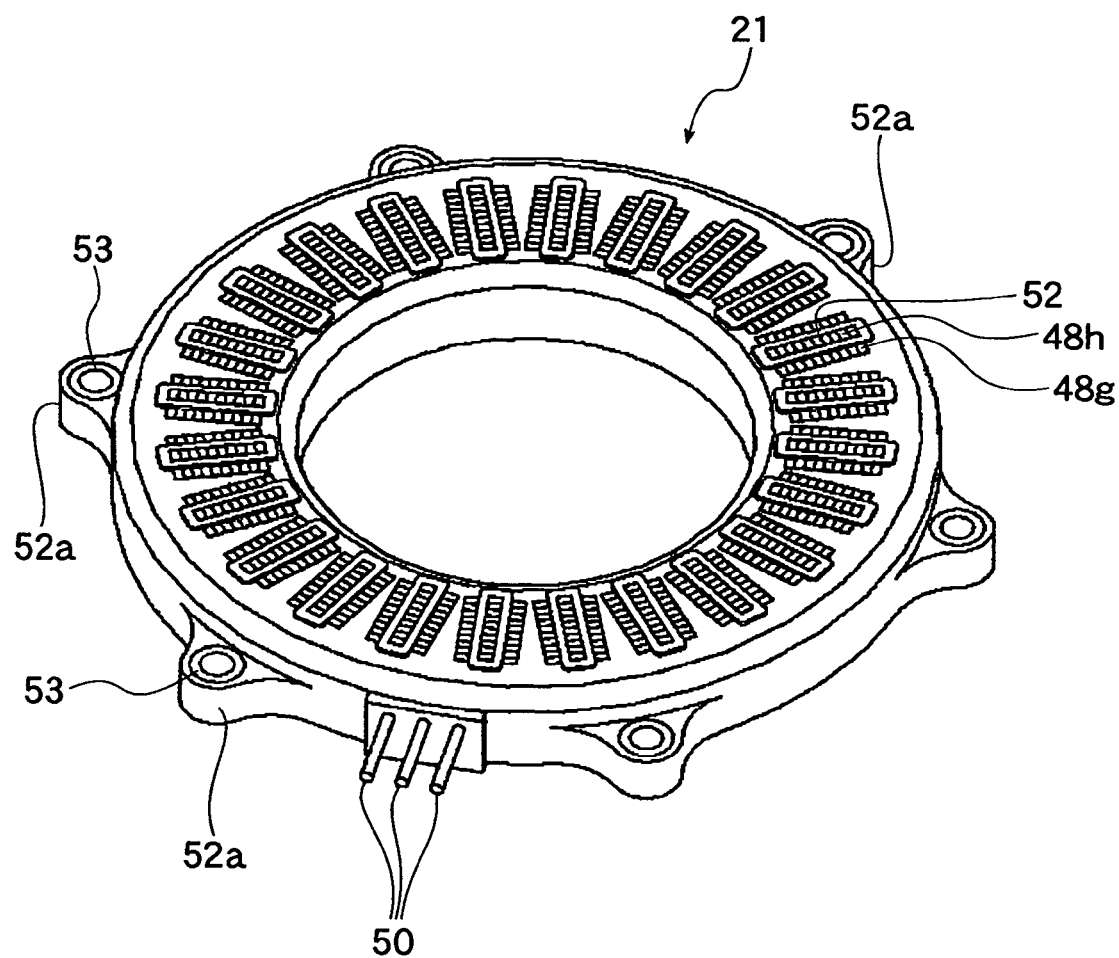
FIG. 13 is a perspective view of a stator of an electric motor according to the third embodiment of the present invention.
Figure 14:
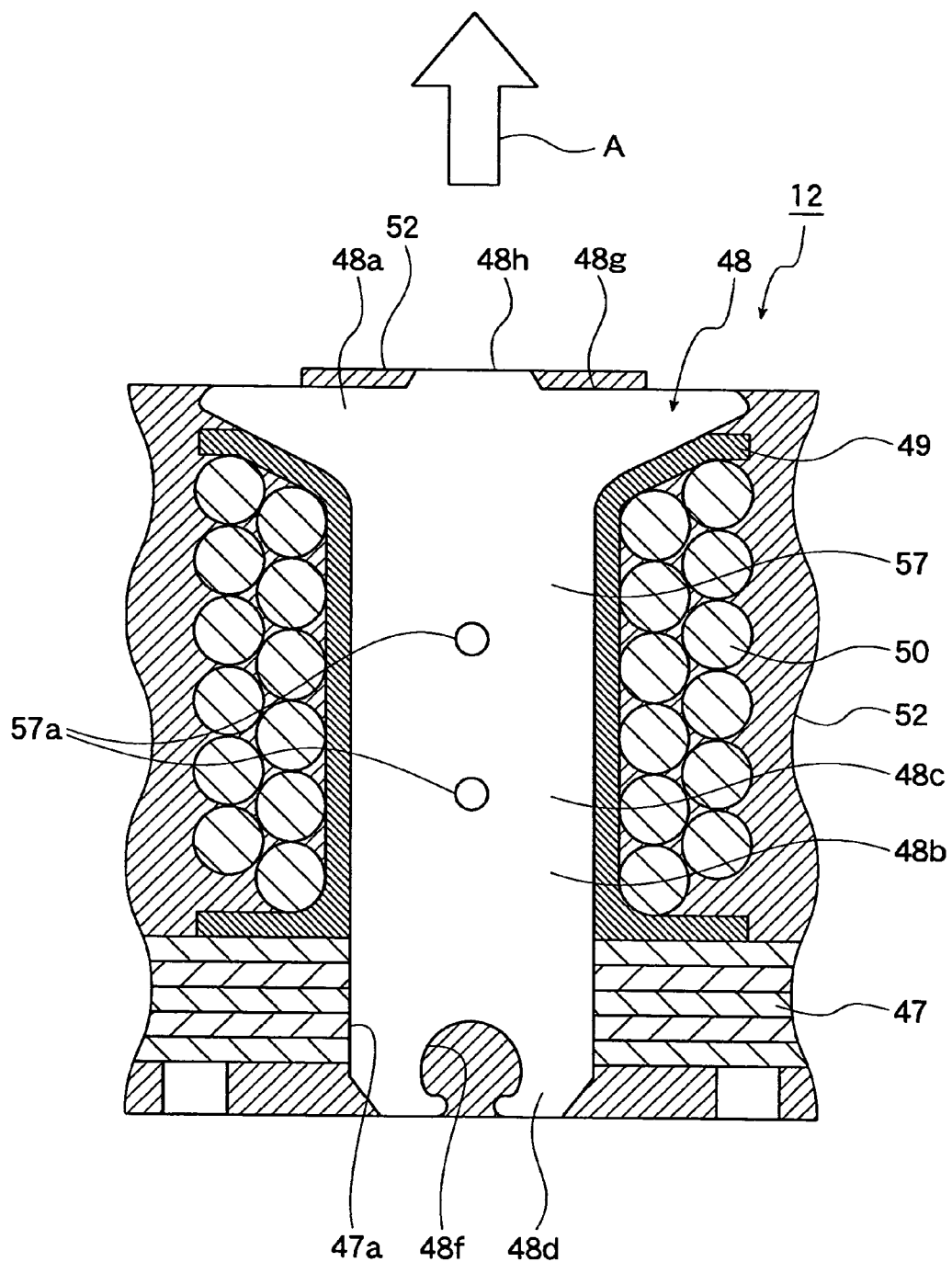
FIG. 14 is a sectional view, in an enlarged scale, showing a state in which the stator yoke core, the tooth and the coil, which are fixed to a mold, according to the third embodiment.
Figure 15:
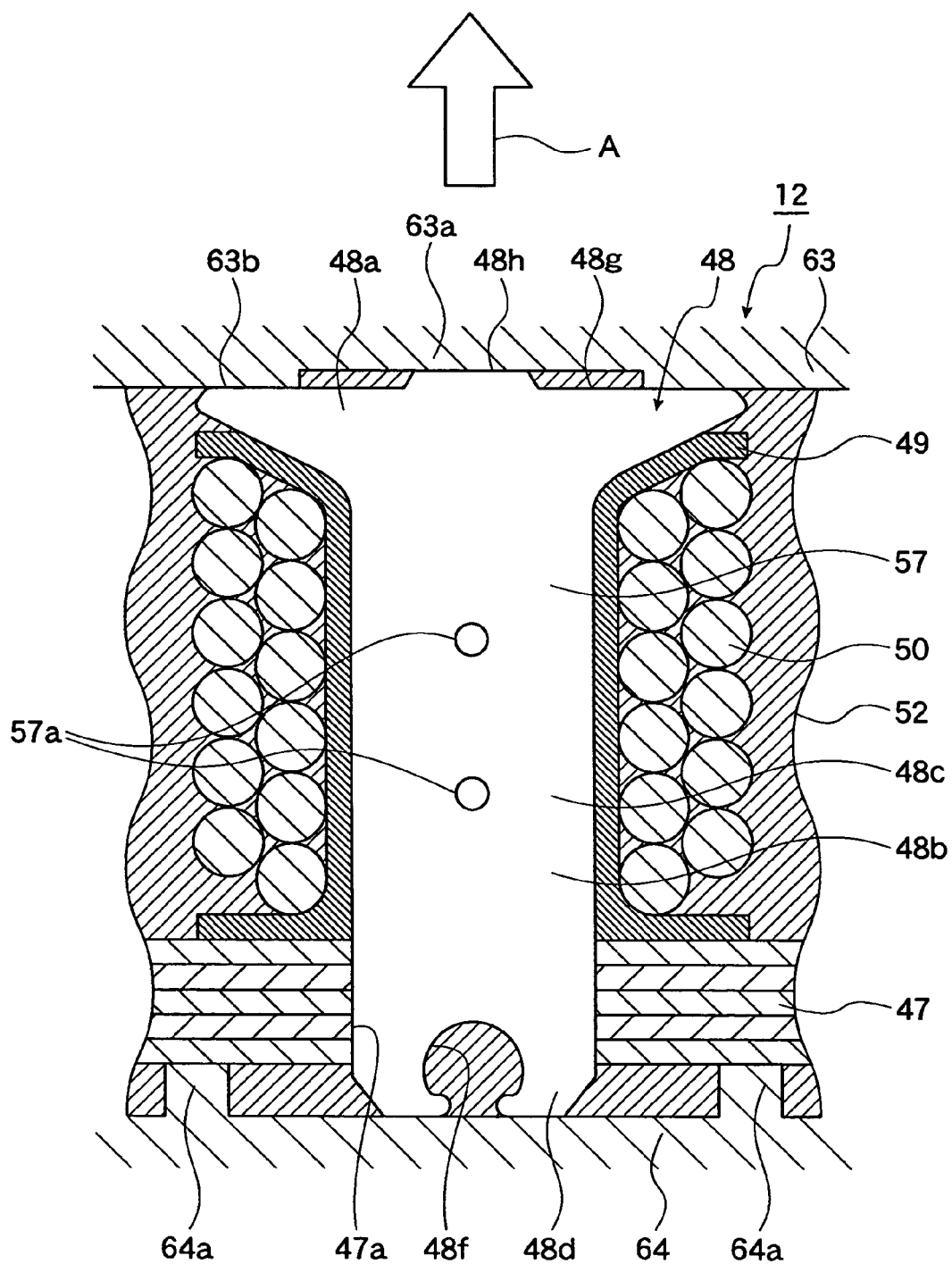
FIG. 15 is a sectional view showing a state that the stator yoke core, the tooth and the coil are clamped by upper and lower mold halves and fixed thereto according to the third embodiment.
Figure 16:
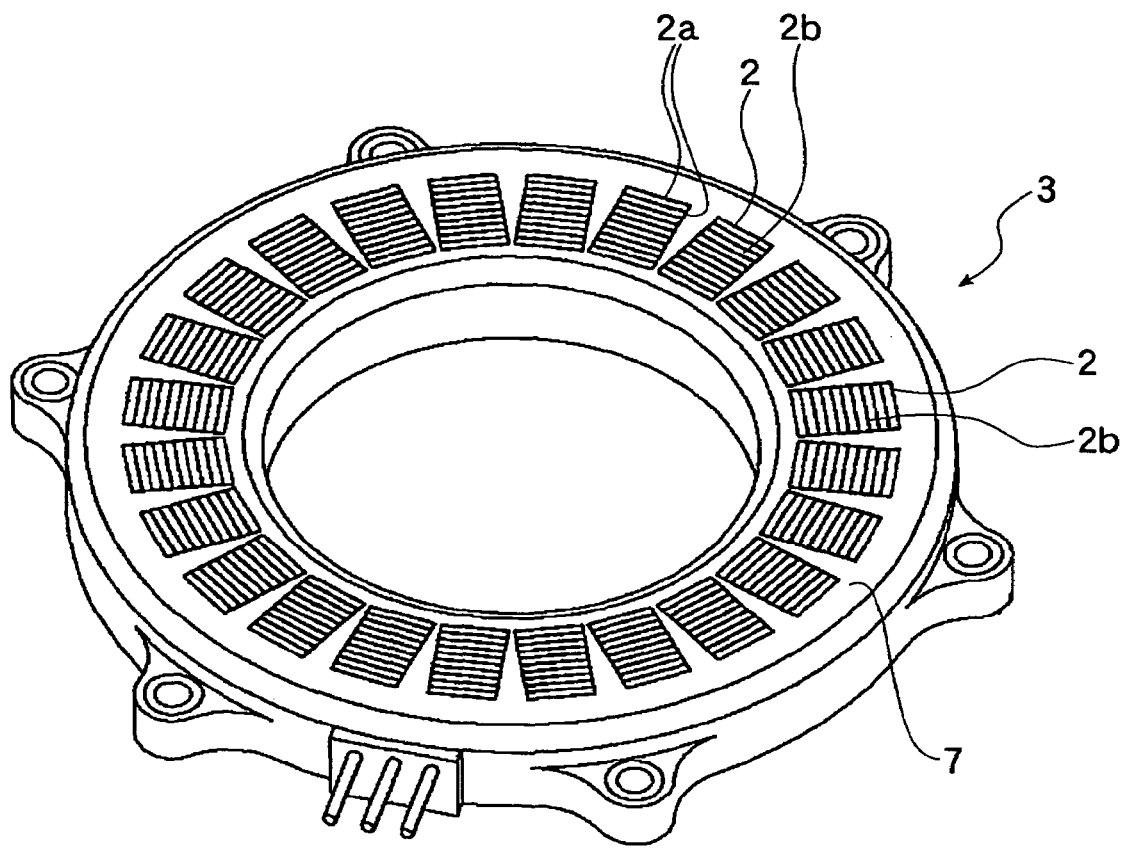
FIG. 16 is a perspective view of a stator of a conventional structure.
Figure 17:
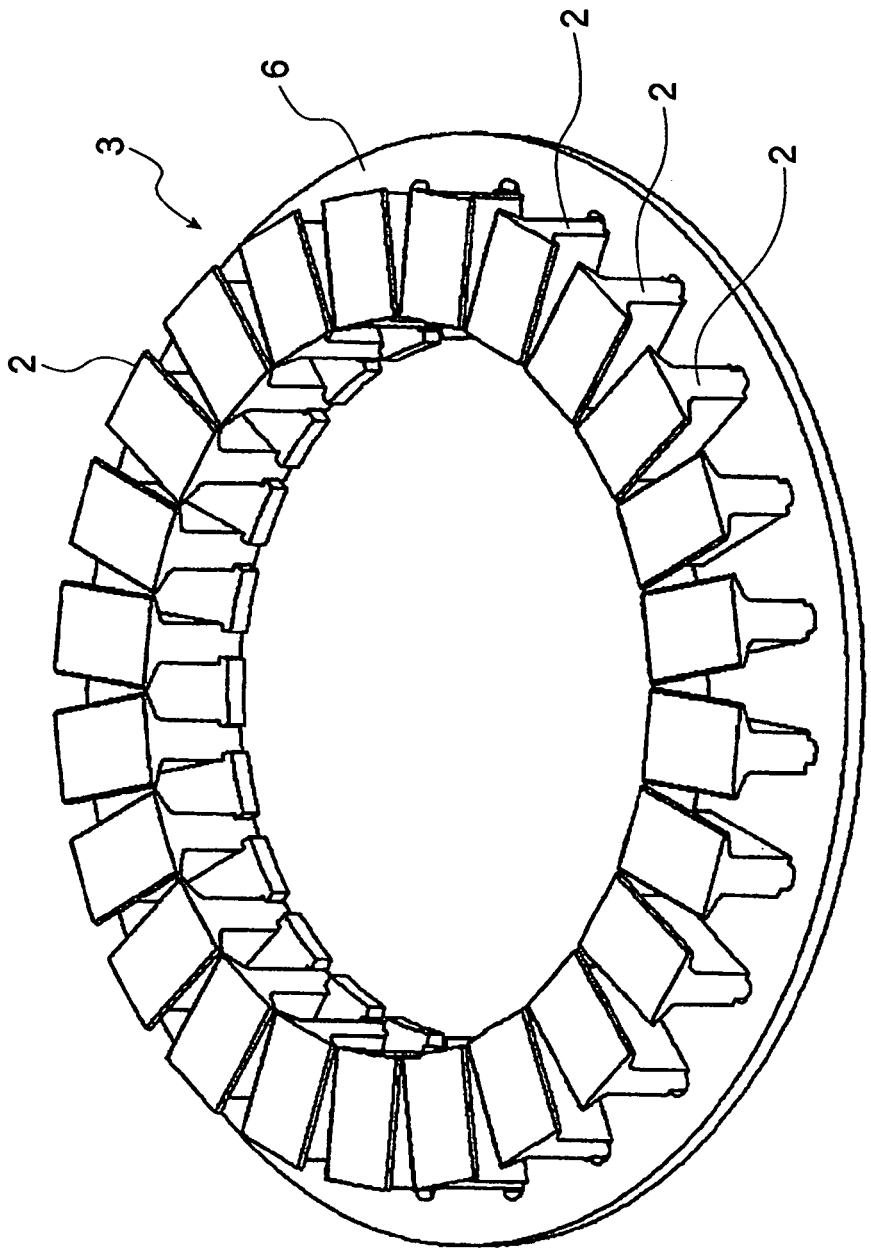
FIG. 17 is a perspective view showing a stator yoke core and tooth of the stator of FIG. 16.
Figure 18:
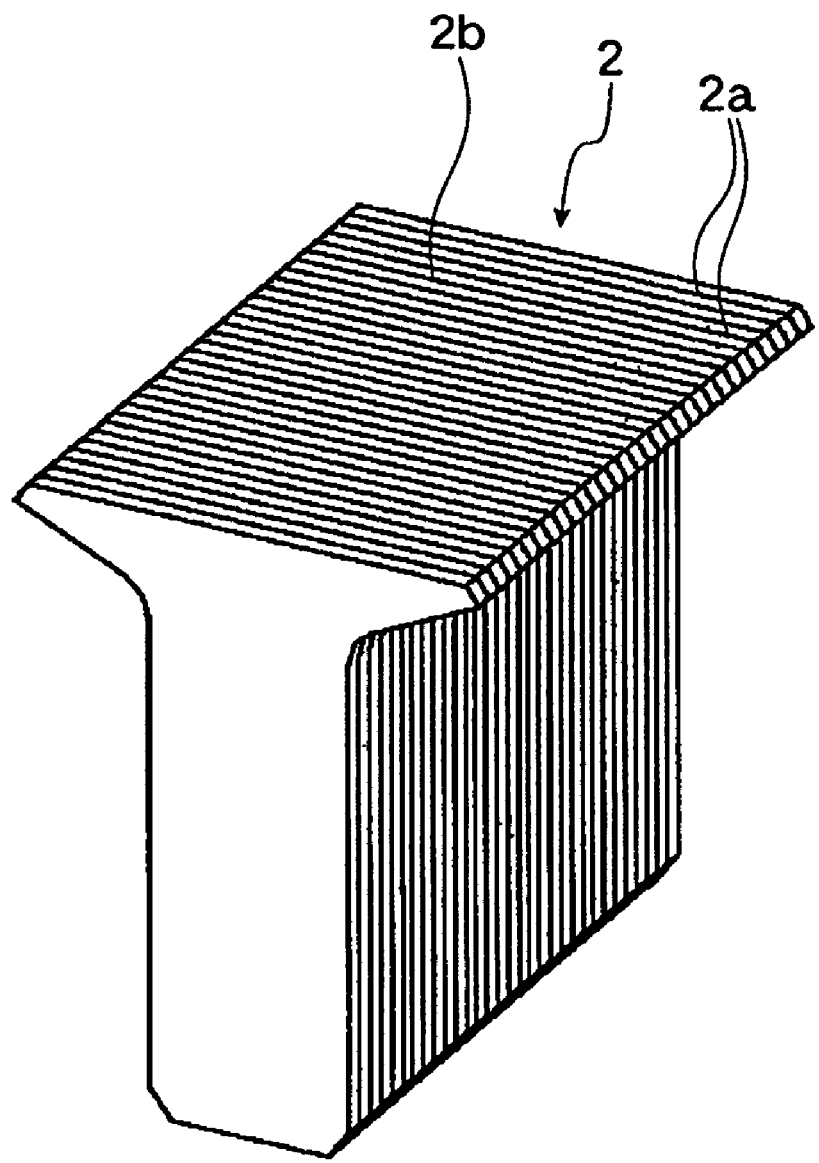
FIG. 18 is a perspective view of the tooth (each of the teeth) of the conventional structure.
Figure 19:
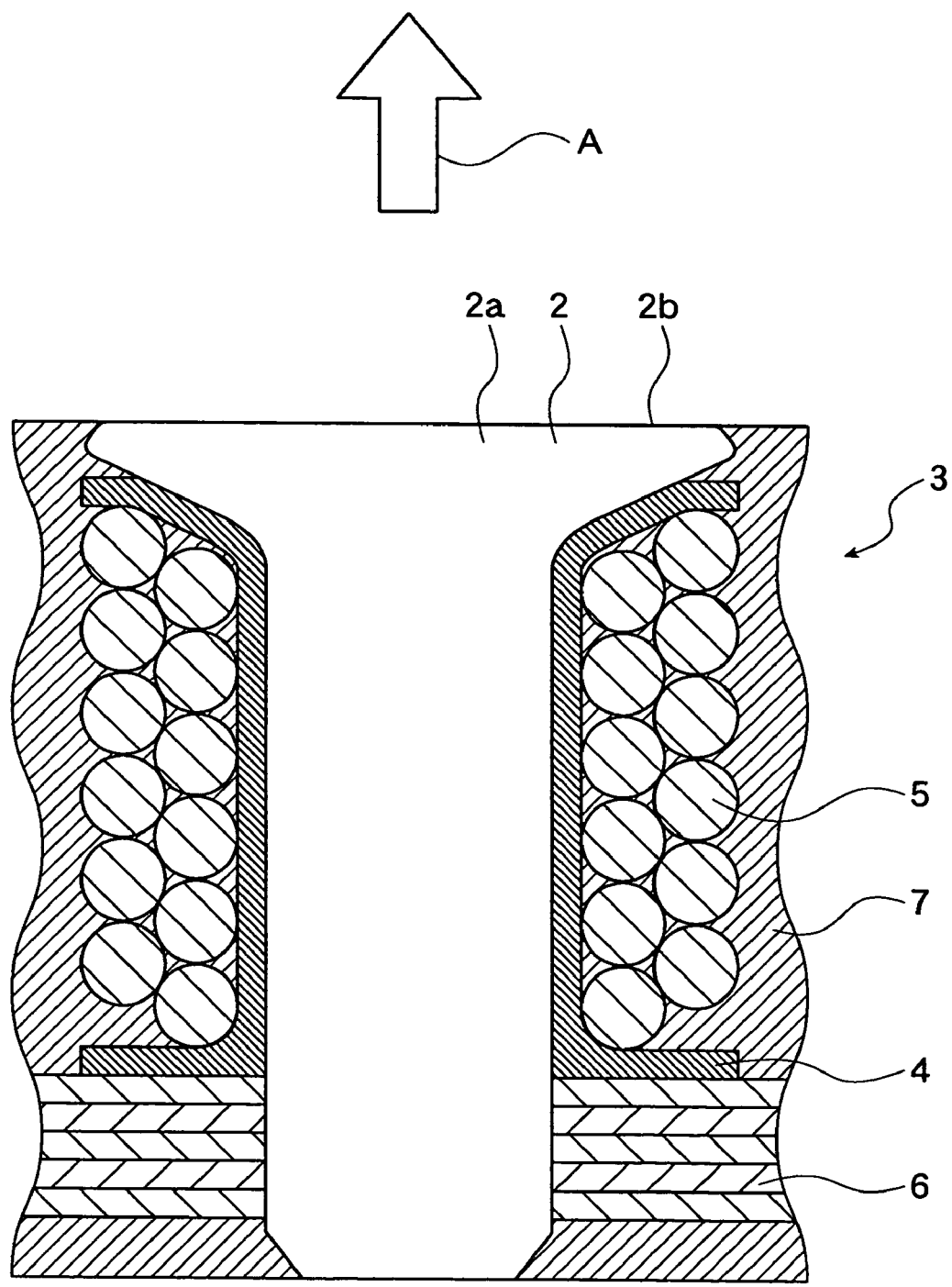
FIG. 19 is a sectional view showing the conventional structure corresponding to FIG. 11.

FIGS. 13 to 15 represent the third embodiment of the present invention.

In the first embodiment, a portion other than the protruded portion 48h of the tooth opposing surface 48a are covered entirely with the molding resin 52. However, in this third embodiment, the portion other than the protruded portion 48h is partially covered with the molding resin 52.

In this embodiment, at a time when the stator 21 is molded, the protruded portion 48h of the tooth opposing surface 48a is pressed by a pressing portion 63a of an upper half mold 63, as shown in FIG. 15, and the portion other than the protruded portion 48h is partially pressed by the other pressing portion 63b of the upper half mold 63.

Further, the stator yoke core 47 is positioned by abutting a positioning pin 64a formed to a lower half mold 64 against this stator yoke core 47.

As mentioned above, the tooth (teeth) 48 can be prevented from coming off by partially covering the portion other than the protruded portion 48h of the tooth opposing surface 48a with the molding resin 52.

The structures and functions other than the above are substantially the same as those mentioned with reference to the first embodiment, and accordingly, the descriptions thereof will be omitted herein.

It is to be noted that the present invention is not limited to the described embodiment and many other changes and modifications may be made without departing from the scopes of the appended claims.

For example, the rotary electric motor of the present invention is not limited to the axial-gap type and other types may be adopted as far as the teeth are fixed by the molding resin.

What is claimed is:

1. A rotary electric machine comprising:
    a stator including a plurality of teeth, a coil wound around each of the plurality of teeth, and a stator yoke core connecting the respective teeth, the teeth and the stator yoke core being integrally fixed by a molding resin; and
    a rotor provided with a plurality of magnets disposed so as to face the teeth, respectively, the teeth and the magnets separated from each other by a space therebetween,
    wherein each of the teeth comprises a head portion facing opposite the magnets, a coil wind-up portion around which the coil is wound up, and an insert portion configured to be inserted into an opening of the stator yoke core, the insert portion comprising a groove formed in a portion of the insert portion that protrudes from the stator yoke core, the groove fillable with molding resin to inhibit the teeth from coming off of engagement with the stator yoke core.

2. The rotary electric machine according to claim 1, wherein the teeth and the magnets are arranged so as to oppose each other, with a space between the teeth and the magnets in a rotation axis direction.

3. The rotary electric machine according to claim 1, wherein each of the teeth is composed of a plurality of magnetic steel plates which are laminated one by one, and fitting portions are formed on each of the respective steel plates so as to define protruded portions and recessed portions such that the protruded portion of the fitting portion of one magnetic steel plate is fitted and fixed to the recessed portion of the fitting portion of an adjacent magnetic steel plate when the magnetic steel plates are laminated together.

4. The rotary electric machine according to claim 1, wherein each of the teeth is formed into T-shaped body by laminating the plurality of magnetic steel plates and has the head portion and a leg portion, the head portion being a wider portion of the T-shaped body which is disposed opposite the magnet, the leg portion including the coil wind-up portion around which the coil is wound up and which has a substantially constant width and the insert portion which is inserted into the stator yoke core.

5. An electric wheelchair comprising:
    a frame structure constituting a vehicle body frame; a seat disposed on the frame structure;
    a pair of driving wheel units including two wheels;
    a rotary electric machine mounted to each of the paired driving wheel units; and
    an operation member operatively connected to the rotary electric machine for operating the driving wheel units,
    the rotary electric machine comprising a stator including a plurality of teeth which are each wound up by a coil and a stator yoke core connecting the respective teeth, the teeth and the stator yoke core being integrally fixed by a molding resin; and a rotor provided with a plurality of magnets disposed so as to face the teeth, respectively, the teeth and the magnets separated from each other by a space therebetween, wherein each of the teeth comprises a head portion disposed opposite the magnets, a coil wind-up portion which is wound up by the coil and an insert portion configured to be inserted into the stator yoke core, the insert portion comprising a groove formed in a portion of the insert portion that protrudes from the stator yoke core, the groove fillable with molding resin to inhibit teeth from coming off of engagement with the stator yoke core.

6. A rotary electric machine comprising:

a stator including a plurality of teeth which are each wound up by a coil and a stator yoke core connecting the respective teeth, the teeth and the stator yoke core being integrally fixed by a molding resin; and a rotor provided with a plurality of magnets disposed so as to face opposite the teeth, respectively, the teeth and the magnets separated from each other by a space therebetween, wherein each of the teeth comprises a head portion disposed opposite the magnets, a coil wind-up portion which is wound up by the coil and an insert portion configured to be inserted into the stator yoke core, the head portion formed with an opposing surface to the rotor, the opposing surface formed with a protruded portion extending in a radial direction of the stator and extending along a central portion of the opposing surface in a circumferential direction of the stator, at least a portion of the opposing surface on either side of the protruded portion being covered with the molding resin so as to inhibit the teeth from coming off of engagement with the stator yoke core.

7. The rotary electric machine according to claim 6, wherein the teeth and the magnets are arranged so as to oppose each other, with a space between the teeth and the magnets in a rotation axis direction.

8. The rotary electric machine according to claim 6, wherein each of the teeth is composed of a plurality of magnetic steel plates which are laminated one by one, and fitting portions are formed on each of the respective steel plates so as to define protruded portions and recessed portions such that the protruded portion of the fining portion of one magnetic steel plate is fitted and fixed to the recessed portion of the fitting portion of an adjacent magnetic steel plate when the magnetic steel plates are laminated together.

9. The rotary electric machine according to claim 6, wherein each of the teeth is formed into T-shaped body by laminating the plurality of magnetic steel plates and has the head portion and a leg portion, the head portion being a wider portion of the T-shaped body which is disposed opposite the magnet, the leg portion including the coil wind-up portion around which the coil is wound up and which has a substantially constant width and the insert portion which is inserted into the stator yoke core.

10. An electric wheelchair comprising:
a frame structure constituting a vehicle body frame; a seat disposed on the frame structure;
a pair of driving wheel units including two wheels;
a rotary electric machine mounted to each of the paired driving wheel units; and
an operation member operatively connected to the rotary electric machine for operating the driving wheel units,
the rotary electric machine comprising a stator including a plurality of teeth which are each wound up by a coil and a stator yoke core connecting the respective teeth, the teeth and the stator yoke core being integrally fixed by a molding resin; and
a rotor provided with a plurality of magnets disposed so as to face the teeth, respectively, the teeth and the magnets separated from each other by a space therebetween,
wherein each of the teeth comprises is composed of a head portion disposed opposite the magnets, a coil wind-up portion which is wound up by the coil and an insert portion configured to be inserted into the stator yoke core, the head portion formed with an opposing surface to the rotor, the opposing surface formed with a protruded portion extending in a radial direction of the stator and extending along a central portion of the opposing surface in a circumferential direction of the stator, at least a portion of the opposing surface on either side of the protruded portion being covered with the molding resin so as to provide a coming-off prevention portion to inhibit the teeth from coming off of engagement with the stator yoke core.

11. The rotary electric machine of claim 1, wherein the groove comprises a narrow opening and a relatively large cavity.

12. The electric wheelchair of claim 5, wherein the groove comprises a narrow opening and a relatively large cavity.

13. The rotary electric machine of claim 1, wherein the groove is formed on a side surface of the portion of the insert portion that protrudes from the stator yoke core.

14. The electric wheelchair of claim 5, wherein the groove is formed on a side surface of the portion of the insert portion that protrudes from the stator yoke core.

* * * * *

UNITED STATES PATENT AND TRADEMARK OFFICE
CERTIFICATE OF CORRECTION

PATENT NO. : 7,642,686 B2 Page 1 of 1
APPLICATION NO. : 11/488972
DATED : January 5, 2010
INVENTOR(S) : Shinya Naitou and Haruyoshi Hino It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 597 days.

At column 4, line 67, please delete "and by" and insert --and by the--, therefor.

At column 7, line 22, please delete "effectivily," and insert --effectively,--, therefor.

At column 9, line 48, please delete "fining" and insert --fitting--, therefor.

Signed and Sealed this

Seventeenth Day of August, 2010

David J. Kappos
*Director of the United States Patent and Trademark Office*